(12) United States Patent
Dogul et al.

(10) Patent No.: US 7,343,062 B1
(45) Date of Patent: Mar. 11, 2008

(54) SAFETY LIGHT CURTAIN WITH MEMS

(75) Inventors: James E. Dogul, Hudson, NH (US); Hassan R. Manjunath, Nashua, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/333,432

(22) Filed: Jan. 17, 2006

(51) Int. Cl.
*G02B 6/26* (2006.01)

(52) U.S. Cl. .......................... 385/15; 385/12

(58) Field of Classification Search ............... None
See application file for complete search history.

(56) References Cited

U.S. PATENT DOCUMENTS

| | | | |
|---|---|---|---|
| 4,015,122 A * | 3/1977 | Rubinstein | 250/221 |
| 5,130,532 A * | 7/1992 | Clemens | 250/221 |
| 5,198,661 A | 3/1993 | Anderson | |
| 5,218,196 A * | 6/1993 | Dogul et al. | 250/221 |
| 5,281,809 A | 1/1994 | Anderson | |
| 5,302,942 A | 4/1994 | Blau | |
| 5,424,532 A | 6/1995 | Occheto | |
| 5,801,376 A | 9/1998 | Haberl | |
| 6,166,371 A | 12/2000 | Milbrath | |
| 6,175,106 B1 | 1/2001 | Buitkamp | |
| 6,294,777 B1 | 9/2001 | Shteynberg | |
| 6,297,498 B1 | 10/2001 | Shteynberg | |
| 6,354,716 B1 | 3/2002 | Chen | |
| 6,750,439 B2 | 6/2004 | Nakazaki | |
| 6,791,074 B2 | 9/2004 | Hahn | |
| 6,872,932 B2 | 3/2005 | Emmanuel | |
| 7,110,636 B2 * | 9/2006 | Takahashi et al. | 385/18 |

* cited by examiner

*Primary Examiner*—Sung Pak
*Assistant Examiner*—Chad H. Smith
(74) *Attorney, Agent, or Firm*—Amin Turocy & Calvin LLP; William R. Walbrun

(57) ABSTRACT

A safety light curtain comprises a light emitter and a first micro-machined electromechanical system (MEMS), wherein the first MEMS receives light emitted by the emitter and sequentially reflects the received light to a first plurality of light wave guides. A detector receives an optical signal relating to light from at least one of the first plurality of light wave guides, the optical signal received by the detector employed to control operation of a machine associated with the safety light curtain.

28 Claims, 13 Drawing Sheets

SAFETY LIGHT CURTAIN WITH MEMS

TECHNICAL FIELD

The subject invention relates generally to industrial safety systems and, more particularly, to safety light curtains.

BACKGROUND

Industrial processes are employed in connection with producing numerous products that are utilized every day by consumers. For instance, everything from textiles to toothbrushes to automobiles to complex electronic devices is produced in industrial environments. To effectuate production of such items, complex and oftentimes dangerous equipment must be employed. For example, to create an automobile door, sheet metal must be cut in a desired shape by large cutting devices. Without adequate safety mechanisms, one or more individuals may become seriously injured and/or disfigured by accidentally placing a body part in an improper place at an inopportune time. Thus, many industrial devices are associated with safety mechanisms that cause such devices to automatically shut down when an individual or object is detected in an improper position.

One example of a safety device that is commonly employed in industrial environments is a safety light curtain. Safety light curtains are utilized to ensure that objects of threshold sizes do not come within a certain distance of particular portions of machinery. More specifically, a plurality of light emitters are aligned with a plurality of light detectors such that multiple beams of light are emitted in parallel to one another by the emitters and received by respective detectors. The detectors can be coupled to a device that is employed in connection with analyzing the light signals (the beams of light). In a detailed example, the detectors can be sequentially enabled by a shift register, and the received light signal can be analyzed in sequence by a microprocessor, which determines status of each light beam (e.g., whether a certain light beam is impeded).

If, upon analyzing the received signal, a determination is made that one or more beams of light has been impeded (such that light emitted from an emitter does not reach a corresponding detector), a microcontroller can communicate with output devices that are coupled to a controlling element to shut down a machine associated with the safety light curtain. Thereafter the machine can be manually restarted upon the beams being unimpeded. As can be surmised from the above, safety light curtains have saved numerous individuals from serious injury as well as increased useful life of machines (by protecting such machines from foreign objects in sensitive areas).

Today's safety light curtains, however, are not without deficiencies. In particular, conventional safety light curtains can be complex in nature, as they must include multiple emitters and detectors (one each for a beam of light). In larger safety light curtains, a significant number of emitters and detectors may be required, thus resulting in significant cost and reliability concerns for such light curtains. Furthermore, in environments where explosion is possible, all electrical devices (e.g., each emitter and detector) must be enclosed in explosion-resistant housing. Again, with larger light curtains, housing each emitter and each detector with explosion-resistant material can be quite costly.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Described herein are one or more safety light curtains that exhibit various advantages over conventional safety light curtains, including reduced cost, complexity, and weight. The safety light curtains can be utilized in an industrial setting to aid in avoidance of injury to an individual, damage to a machine, and/or damage to a product. The safety light curtains described herein include a reduced number of emitters and/or detectors when compared with conventional safety light curtains, thus reducing weight, complexity, and cost of safety light curtains without sacrificing performance. Furthermore, the safety light curtains described herein can be more easily employed within explosive environments. In more detail, electrical devices must be housed in explosive-resistant material. For instance, in conventional safety light curtains, which include multiple emitters and detectors (electrical devices), each emitter and detector must be housed in explosive-resistant material. In contrast, the safety light curtains that accord to the hereto-appended claims can be effectuated with a very small number of emitters and detectors.

To enable the aforementioned advantages, one or more micro-machined electro-mechanical systems (MEMS) can be employed in connection with an emitter and/or a detector. The MEMS can include and/or be associated with at least one mirror, wherein the position of the mirror can be rapidly altered to direct light to/from each of a plurality of optical fibers. For instance, a MEMS can be associated with an emitter and can be configured to receive light from the emitter and to sequentially direct the light to each of a first plurality of optical fibers. Pursuant to an example, a power source can be programmed to provide the MEMS with voltage/current to effectuate changes in position of a mirror included therein and/or associated therewith, thereby causing the mirror to reflect light to each optical fiber within the first plurality of optical fibers in a certain sequence. A detector can be provided to receive light from at least one of the plurality of optical fibers, and analysis circuitry/software associated therewith can determine whether a threshold number of beams of light emitted from the first plurality of optical fibers has been obstructed. If so, for example, a machine associated with the safety light curtain can be shut down.

In another example, a second plurality of optical fibers can be associated with the first plurality of optical fibers, such that each optical fiber within the first plurality of optical fibers corresponds to an optical fiber within the second plurality of optical fibers. Thus, beams of light can be relayed between the first and second pluralities of optical fibers in a substantially parallel manner. The second plurality of optical fibers can be spatially separated from the first plurality of optical fibers, thereby causing beams of light to travel through space from the first plurality of optical fibers to the second plurality of optical fibers. A second MEMS can be associated with the second plurality of optical fibers, such that optical signals from each of the second plurality of optical fibers can be sequentially provided to a detector. It can thus be discerned that the first and second MEMS can be synchronized to deliver light to and receive light from corresponding optical fibers within the first and second pluralities of optical fibers. Optical signals received at the detector can then be analyzed to determine whether a threshold number of beams of light have been obstructed, and a machine associated with the beams of light can be controlled accordingly (e.g., shut down if a threshold number of beams is obstructed).

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
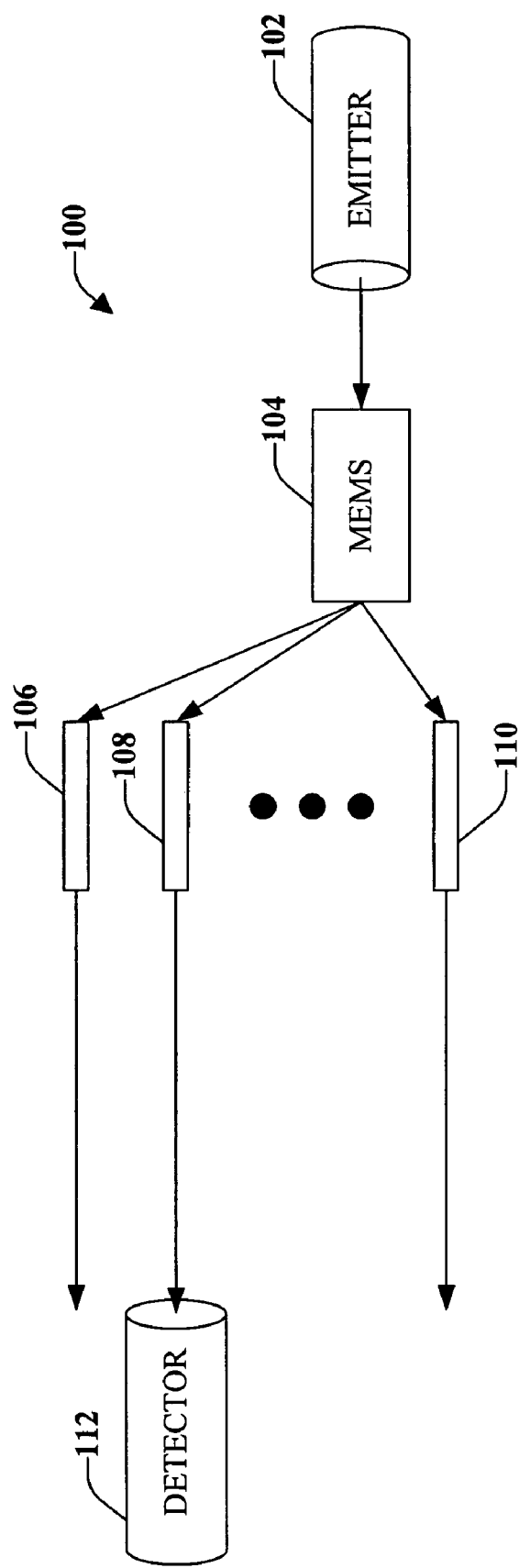
FIG. 1 illustrates a safety light curtain that includes a MEMS to sequentially relay light from an emitter to a plurality of optical fibers.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a safety light curtain 100 that can be employed in connection with a potentially hazardous machine within an industrial automation environment. The safety light curtain 100 can include an emitter 102 that directs light to a micro-machined electromechanical system (MEMS) 104. The MEMS in turn can be configured to sequentially direct light from the emitter 102 to a plurality of light wave guides, 106-110, which can be optical fiber such as glass fibers, plastic fibers, or a combination thereof. It is understood, however, that any suitable light wave guides can be employed in connection with the hereto-appended claims. For example, the MEMS 104 can include a mirror and one or more lenses, such that light from the emitter 102 can be reflected from the MEMS 104 to each of the plurality of light wave guides 106-110. In more detail, the MEMS 104 can be associated with a power source (not shown) that provides electrical current/voltage to the MEMS 104, enabling a mirror and/or lens associated with the MEMS 104 to reflect light to a particular light wave guide. Therefore, for instance, the MEMS 104 can sequentially provide light to each light wave guide within the plurality of light wave guides 106-110.

Light provided to the plurality of light wave guides 106-110 can then be directed towards at least one detector 112. Specifically, light from the light wave guides 106-110 can be directed over a spatial region associated with a particular machine, set of machines, and/or portion of machine(s). Furthermore, light beams emitted from the plurality of light wave guides 106-110 can be substantially in parallel with one another and separated by a threshold distance. For example, the beams can be separated by ten millimeters, twenty millimeters, or any other suitable distance. The emitter 102 can emit light with a particular pulse that is known by the detector 112 and analysis circuitry (not shown) associated therewith. Therefore, the detector 112 and the analysis circuitry can recognize and analyze light provided by the emitter 102 (by way of at least one of the light wave guides 106-110) while filtering other light sources. Furthermore, through employment of the light wave guides 106-110, interference can be reduced as the optical fibers 106-110 can provide a close approximation of an ideal point source (e.g., there is a reduced chance that interference will exist). Additionally, the light wave guides 106-110 can be placed in closer proximity to one another, as resolution constraints associated with conventional emitters and detectors will be non-existent.

As can be discerned by one skilled in the art, the safety light curtain 100 can be employed with a single emitter, thereby reducing size, complexity, weight, and/or expense associated with safety light curtains. Additionally or alternatively, multiple emitters 102 can be employed with multiple MEMS within a single safety light curtain. Particular elements employed within safety light curtains can vary depending upon environment or desired implementation of the safety light curtain 100. Furthermore, it is apparent that the safety light curtain 100 can include one or more MEMS in connection with reducing a number of detectors within the safety light curtain 100. For instance, light that exits the light wave guides 106-110 can be provided to a MEMS, which then sequentially directs light relating to each of the plurality of light wave guides 106-110 to a detector. Some variations of safety light curtains that can be employed in accordance with the hereto-appended claims are described below.

In operation, beams of light exiting the plurality of light wave guides 106-110 can collectively create a wall or screen, such that an object (e.g., a hand, an arm, a metal object, . . . ) of sufficient size cannot reach machine(s) or particular portions thereof without disrupting at least one light beam. The detector 112 (and associated control circuitry) can determine that one or more beams of light have been obstructed and cause operation of a machine to be altered. For instance, a machine or portion thereof can be powered down upon a threshold number of beams within the safety light curtain becoming disrupted. Additionally, alarms can be generated and events can be logged upon at least one beam within the safety light curtain becoming disrupted.

Figure 2:
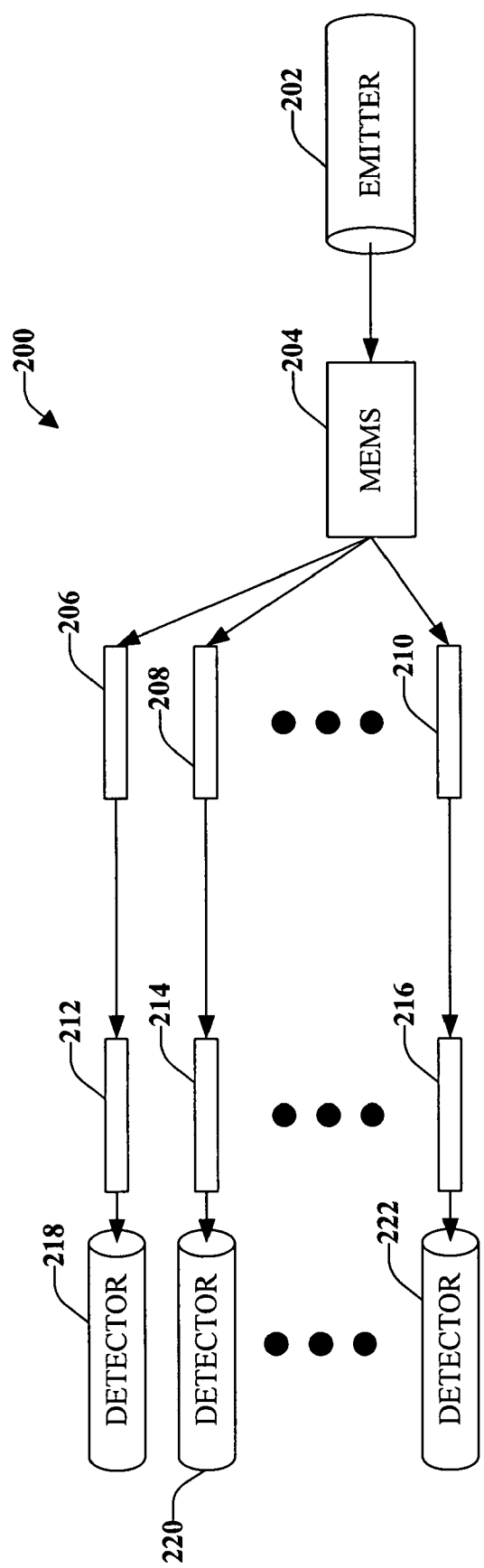
FIG. 2 illustrates a safety light curtain that includes multiple detectors that receive optical signals from a plurality of optical fibers.

Referring now to FIG. 2, a safety light curtain 200 that can be employed in connection with one or more machines is illustrated. The safety light curtain 200 includes an emitter 202 that provides light to a MEMS 204, wherein the MEMS can comprise one or more mirrors. The MEMS 204 can be employed to sequentially direct light from the emitter 202 to a first plurality of light wave guides 206-210. For instance, at a first point in time the MEMS 204 can cause light to be directed towards the light wave guide 206, at a second point in time the MEMS 204 can be utilized to direct light from the emitter 202 to the light wave guide 208, and at an Nth point in time the MEMS 204 can be employed in connection with directing light from the emitter 202 to the light wave guide 210. Thus, it is understood that the MEMS 204 can rapidly cause light from the emitter 202 to be delivered sequentially to the first plurality of light wave guides 206-210. To effectuate relay of light from the emitter 202 to each of the first plurality of light wave guides 206-210, a power source (not shown) can be associated with the MEMS 204 to cause a mirror to alter position. For instance, the MEMS 204 can include a 360 degree translatable mirror and/or a mirror that is associated with pre-defined positions. Upon receipt of current and/or voltage, a mirror within and/or associated with the MEMS 204 can translate to a position that causes light from the emitter 202 to be directed to a desirable location. Furthermore, while for ease of explanation the MEMS 204 is described as delivering light sequentially from the light wave guide 206 to the light wave guide 208 to the light wave guide 210, any suitable order of directing light to the light wave guides 206-210 is contemplated and intended to fall under the scope of the hereto-appended claims. As alluded to the above, one or more of the light wave guides 206-210 can be optical fibers; however, any suitable light wave guides are contemplated and intended to fall under the scope of the hereto-appended claims.

The light wave guides 206-210 can be associated with optical devices that facilitate receipt/capture of light from the MEMS 204. For instance, various reflective devices can be employed in connection with deliverance of light from the emitter 202 to the plurality of light wave guides 206-210. In addition, optical elements (lenses, etc.) can be used to facilitate transfer of light energy from one plurality of light wave guides to the other by means of collimation and focusing of light energy. Light can then travel through the first plurality of light wave guides 206-210 to a second plurality of light wave guides 212-216, wherein the first plurality of light wave guides 206-210 and the second plurality of light wave guides 212-216 can be spatially separated. Such spatial separation results in several beams of light traveling through air across a machine or a certain portion of a machine. The second plurality of light wave guides 212-216 receives light directed from the first plurality of light wave guides 206-210, respectively, and relays such beams of light to a plurality of detectors 218-222. As with the first plurality of light wave guides 206-210, the second plurality of light wave guides 212-216 can be associated with optical devices that aid in receipt of the light from the first plurality of light wave guides 206-210 (as well as optical elements that aid in relay of the light to the plurality of detectors 218-222). The plurality of detectors 218-222 can be coupled to control circuitry (not shown), which can cause a machine or set of machines to shut down if an object obstructs a threshold number of beams of light traveling between the first plurality of light wave guides 206-210 and the second plurality of light wave guides 212-216.

The light curtain 200 provides benefits over conventional light curtains, as complexity, cost, size, and weight of the light curtain 200 is less than complexity, cost, size, and weight associated with conventional safety light curtains. In more detail, today's light curtains require use of a plurality of emitters as well as a plurality of detectors, while the light curtain 200 employs the single emitter 202. Furthermore, while the second plurality of light wave guides 212-216 is shown, it is understood that such guides 212-216 may be optional, as the plurality of detectors 218-222 can directly receive light from the first plurality of light wave guides 206-210. In operation, light is provided to the MEMS 202 from the emitter 202 and thereafter provided to the plurality of light wave guides 206-210. These guides are optically coupled to the plurality of detectors 218-222, which detects light provided from the first plurality of light wave guides 206-210. The second plurality of light wave guides 212-216 are optionally employed to improve characteristics of light beams provided to the plurality of detectors 218-222. Light detected by the detectors 218-222 can be transformed into an electrical signal that can be analyzed to determine whether an object has obstructed a threshold number of light beams. If a determination is made that a threshold number of light beams have been obstructed, a machine associated with the safety light curtain 200 can be shut down.

Figure 3:
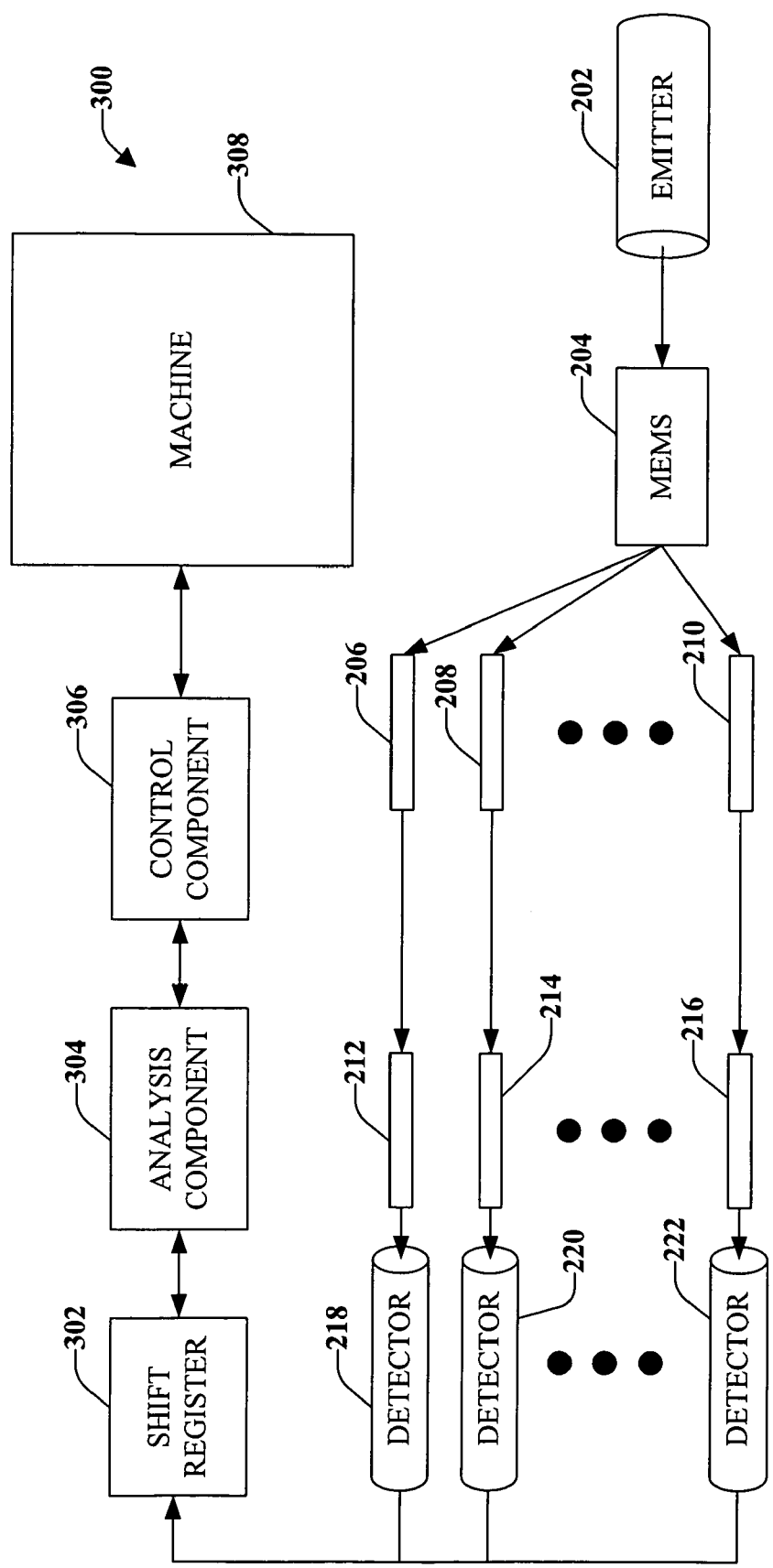
FIG. 3 illustrates a safety light curtain that includes analysis and control circuitry/software to control operation of a machine associated with the safety light curtain.

Now referring to FIG. 3, a safety light curtain 300 for employment in an industrial environment is illustrated. The safety light curtain 300 includes the emitter 202 and the MEMS 204, which is employed to sequentially deliver light from the emitter 202 to the first plurality of light wave guides 206-210. Light can then be directed from such light wave guides 206-210 to the second plurality of light wave guides 212-216 that are spatially separated from the first plurality of light wave guides 206-210. In a disparate implementation, the first plurality of light wave guides 206-210 can provide light directly to the plurality of detectors 218-222. The light relayed between the first plurality of light wave guides 206-210 and the second plurality of light wave guides 212-216 or the plurality of detectors 218-222 can be substantially parallel in nature.

The plurality of detectors 218-222 can be employed to convert optical signals into electrical signals. For example, if no obstruction exists with respect to light delivered from the light wave guide 206, the detector 218 can output a signal indicating lack of an obstruction. Similarly, if an obstruction exists, the detector 218 can output a different signal. In a detailed example, the detectors 218 can respectively output a high voltage signal (e.g., 5 volts) if there is no obstruction and a low voltage signal (e.g., 1 volt) if there is an obstruction. These signals can be received by a shift register 302 and sequentially read by an analysis component 304 from such register 302. The shift register 302 can be continuously repopulated with signals relating to light (or lack thereof) received by the detectors 218-222. If the analysis component 304 determines that an object has obstructed a threshold number of beams of light within the light curtain 300, a control component 306 can be notified and provided with information regarding, for example, which beams of light are associated with an obstruction. The control component 306 can then control an operating parameter associated with a machine 308, wherein the machine can be any suitable industrial machine. For example, the control component 306 can cause the machine 308 to shut down, thereby avoiding injury to an individual and/or a product.

Furthermore, while not shown, redundant components/devices can be employed to protect against failure of the safety light curtain 300. For instance, a single microcontroller can be employed in connection with the analysis component 304 and the control component 306. It may be desirable, however, to include a second microcontroller that acts as a backup to the first microcontroller, wherein the first and second microcontrollers communicate with one another to ensure proper operation of such microcontrollers. If one of the microcontrollers becomes faulty, the other microcontroller can be utilized in connection with the analysis component 304 and the control component 306. Additionally, an alarm can be generated notifying a user of the safety light curtain 300 that a microcontroller is to be replaced.

Figure 4:
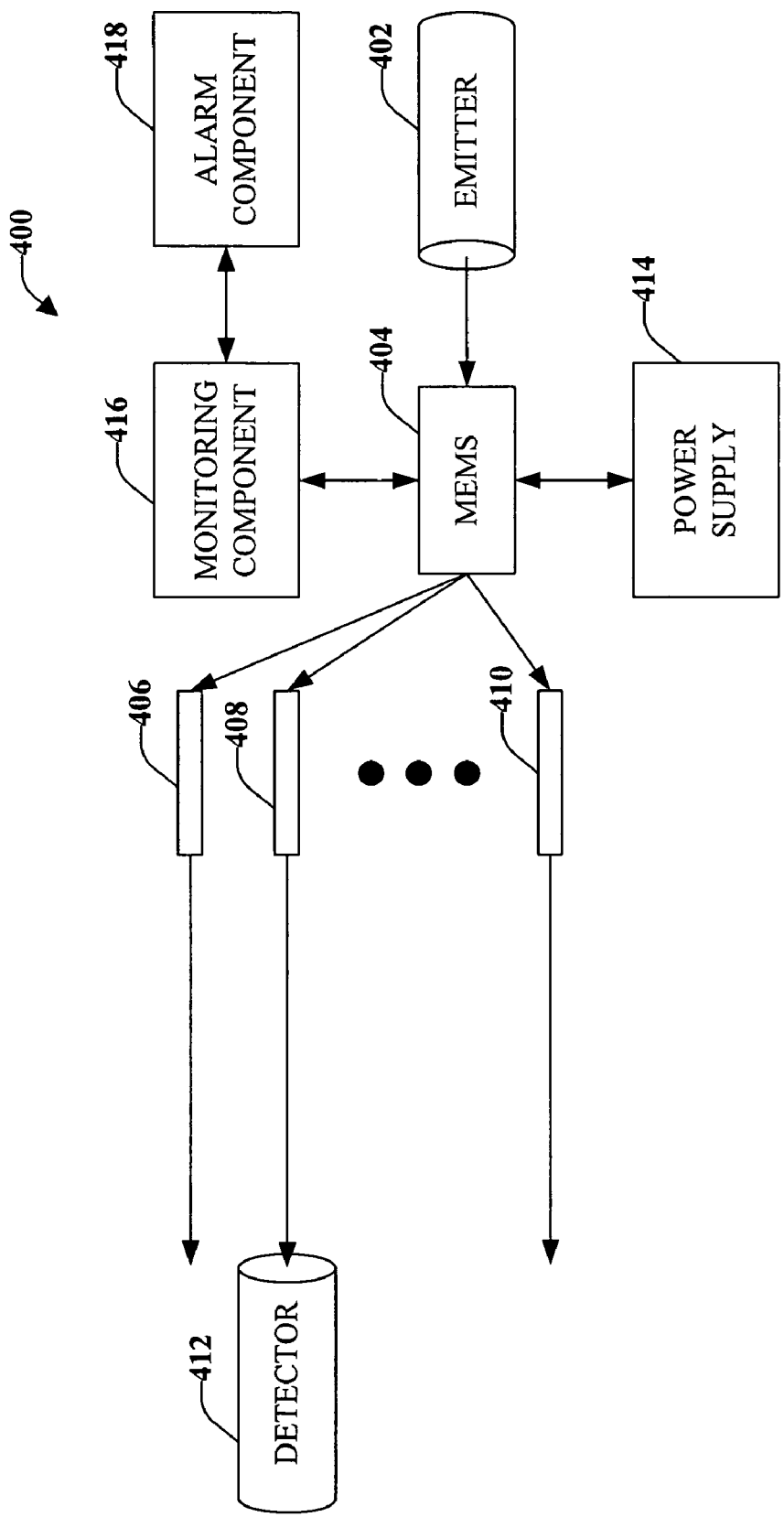
FIG. 4 illustrates a safety light curtain that includes monitoring circuitry/software for monitoring performance of a MEMS.

Referring now to FIG. 4, a safety light curtain 400 for employment within an industrial environment is illustrated. The safety light curtain includes an emitter 402 that provides light to a MEMS 404. For example, the emitter 402 can be one or more light emitting diodes (LEDs), or any other suitable light source. The MEMS 404 is employed to direct light to a plurality of light wave guides 406-410. At least one detector 412 is optically coupled to at least one of the light wave guides 406-410, such that the at least one light wave guide is configured to direct light towards the detector 412. The MEMS 404 receives electrical current and/or voltage from a power supply 414, which causes a mirror associated with the MEMS 404 to direct light to a particular light wave guide. Over time, however, performance of the MEMS 404 may begin to degrade, such that the light curtain 400 does not operate in a manner to ensure safety of an individual, machine, or product. For instance, the MEMS 404 may be associated with insufficient operating speed (e.g., may not direct light between light wave guides at a sufficient speed). Accordingly, a monitoring component 416 can monitor the MEMS 404 for degrading performance and perform diagnostics on the MEMS 404. Further, the monitoring component 416 can determine when in the future the MEMS 404 will begin to fail, as well as calendar maintenance with respect to the MEMS 404. For instance, if the MEMS does not reach certain threshold performance measures relating to speed and/or angle of reflection of light, the monitoring component 416 can detect such lack of effectiveness of the MEMS 404. In addition, performance of the light source 402 can be monitored to insure proper operation within the predetermined parameters.

The monitoring component 416 can be associated with an alarm component 418 that notifies a user relating to a time that the MEMS 404 is and/or will be operating below threshold performance levels. In addition, the monitoring component 418 can have the capability of sending a signal to the control component (not shown) which will inhibit continued operation of the control component until the fault condition is rectified. An alarm generated by the alarm component 418 can be visual in nature, such as flashing lights. Similarly, an alarm created by the alarm component 418 can be audible in nature. In still another example, the alarm component 418 can generate an email message, text message, voice message, and the like, and provide it to an operator of the safety light curtain 400. It can thus be understood that any suitable manner of notifying an operator of an impending and/or predictive performance issue associated with the MEMS 404 is contemplated and intended to fall under the scope of the hereto-appended claims.

Figure 5:
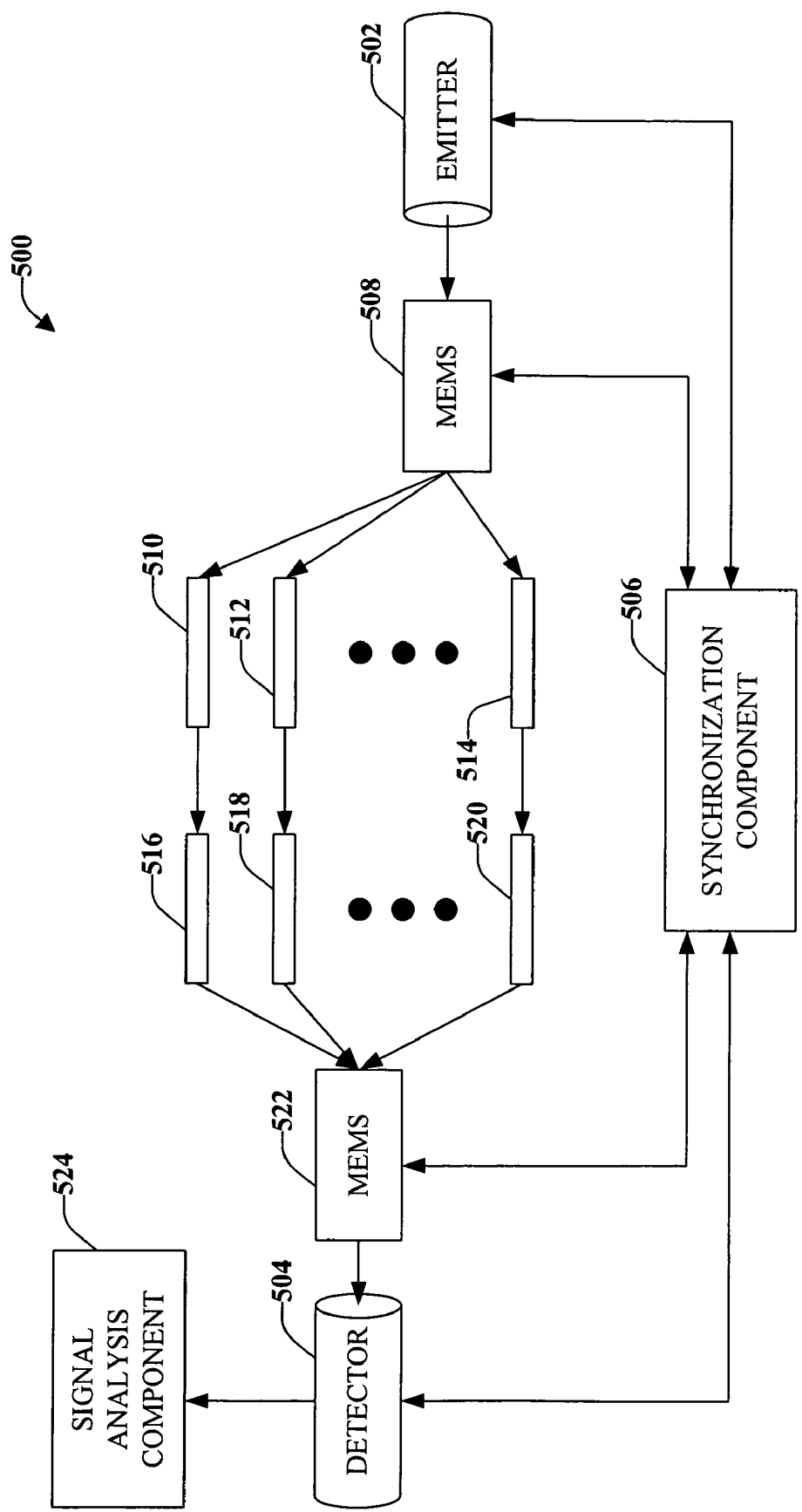
FIG. 5 illustrates a safety light curtain that includes multiple MEMS to relay light to and receive light from a first and second plurality of optical fibers, respectively.

Referring now to FIG. 5, a safety light curtain 500 that can be employed in industrial environments is illustrated to aid in mitigating injury to operators, machinery, and/or products. The safety light curtain 500 includes an emitter 502 and a detector 504, wherein the emitter 502 emits light with a particular pulse pattern and the detector 504 is configured to detect light at such pulse pattern. For example, a synchronization component 506 can be employed in connection with synchronizing the emitter 502 and the detector 504. More particularly, the synchronization component 506 can cause the emitter 502 to provide a synch pulse and can prepare the detector 504 for receipt of the synch pulse.

The emitter 502 can be optically coupled to a first MEMS 508, which can receive electrical voltage and/or current that causes a mirror to be positioned to deliver light from the emitter 502 to one of a first plurality of light wave guides 510-514. Upon receiving another voltage or current, the first MEMS 508 can direct light from the emitter 502 to a different light wave guide amongst the first plurality of light wave guides 510-514. The first MEMS 508 can operate quite quickly, such that light from the emitter 502 is delivered to several light wave guides in a small period of time. The first plurality of light wave guides 510-514 can be associated with optical element(s) that aid in receipt of light from the first MEMS 508 as well as deliverance of light to a second plurality of light wave guides 516-520. Thus, light wave guides, such as fiber optics and other optical elements can be employed to aid in collimation of light provided by the emitter 502.

Like the first plurality of light wave guides 510-514, each light wave guide within the second plurality of light wave guides 516-520 can be associated with optical elements that aid in receipt of light from each of the first plurality of light wave guides 510-514, respectively. Light from one light wave guide within the second plurality of light wave guides 516-520 can then be delivered to a second MEMS 522 that is configured to direct light from the second plurality of light wave guides 516-520 to the detector 504. In a detailed example, the emitter 502 can provide light to the first MEMS 508, which is configured to direct the light to the light wave guide 510. The light wave guide 510 receives the light relayed by the first MEMS 508 and directs the light over a spatial region to the light wave guide 516. The second MEMS 522 is configured to receive light from the light wave guide 516 and direct such light to the detector 504. The MEMS 508 can then be configured, for example, to direct light from the emitter 502 to the light wave guide 512, which relays the light to the light wave guide 518. The MEMS 522 is configured to receive the light from the light wave guide 518 and direct such light to the detector 504. Therefore, for instance, it can be discerned that the first MEMS 508 and the second MEMS 522 can be synchronized by the synchronization component 506 (or another component that can synchronize the MEMS 508, 522). In addition, the synchronization component 506 can have the ability to synchronize the movement of MEMS 522 with the reception of a unique optical signal generated from emitter 202 and received through one of the light wave guides 516-520. Such synchronization can be employed to ensure that the MEMS 522 and 508 are configured to relay light from corresponding light wave gu ides from within the first plurality of light wave guides 510-514 and the second plurality of light wave guides 516-520.

The detector 504 thus receives light from the second plurality of light wave guides 516-520 in a particular order. The detector can convert received optical signals from the second plurality of light wave guides 516-520 to electrical signals and provide the electrical signals to a signal analysis component 524. The signal analysis component 524 can continuously monitor electric signals output by the detector 504, where a certain signal can indicate an obstruction of light between one or more light wave guides in the first and second plurality of light wave guides, respectively. The signal analysis component 524 can then be employed to aid in controlling a machine based upon the signals received from the detector 504.

The safety light curtain 500 provides various advantages over conventional safety light curtains. For instance, the safety light curtain 500 includes fewer emitters and detectors when compared to conventional safety light curtains. In more detail, conventional safety light curtains need an emitter and detector for each beam of light desired within the safety light curtain. The safety light curtain 500 can utilize a single emitter and a single detector to generate numerous light beams (and cover a significant amount of space). Further, the safety light curtain 500 does not need to employ a shift register to analyze light beams. Fewer emitters and detectors as well as no need of a shift register can greatly reduce size, complexity, weight and cost of the safety light curtain 500 when compared with conventional safety light curtains. Furthermore, the light wave guides 510-520 are not associated with electrical components, and thus do not need to be housed in explosive environments. In contrast, with respect to conventional safety light curtains, each emitter and detector needs to be housed in explosion-resistant housing. The safety light curtain 500 includes much fewer emitters and detectors—thus, a need for explosion-resistant housing is reduced. In summary, the safety light curtain 500 provides safety benefits associated with conventional safety light curtains while reducing cost, complexity, and weight of such light curtains.

Figure 6:
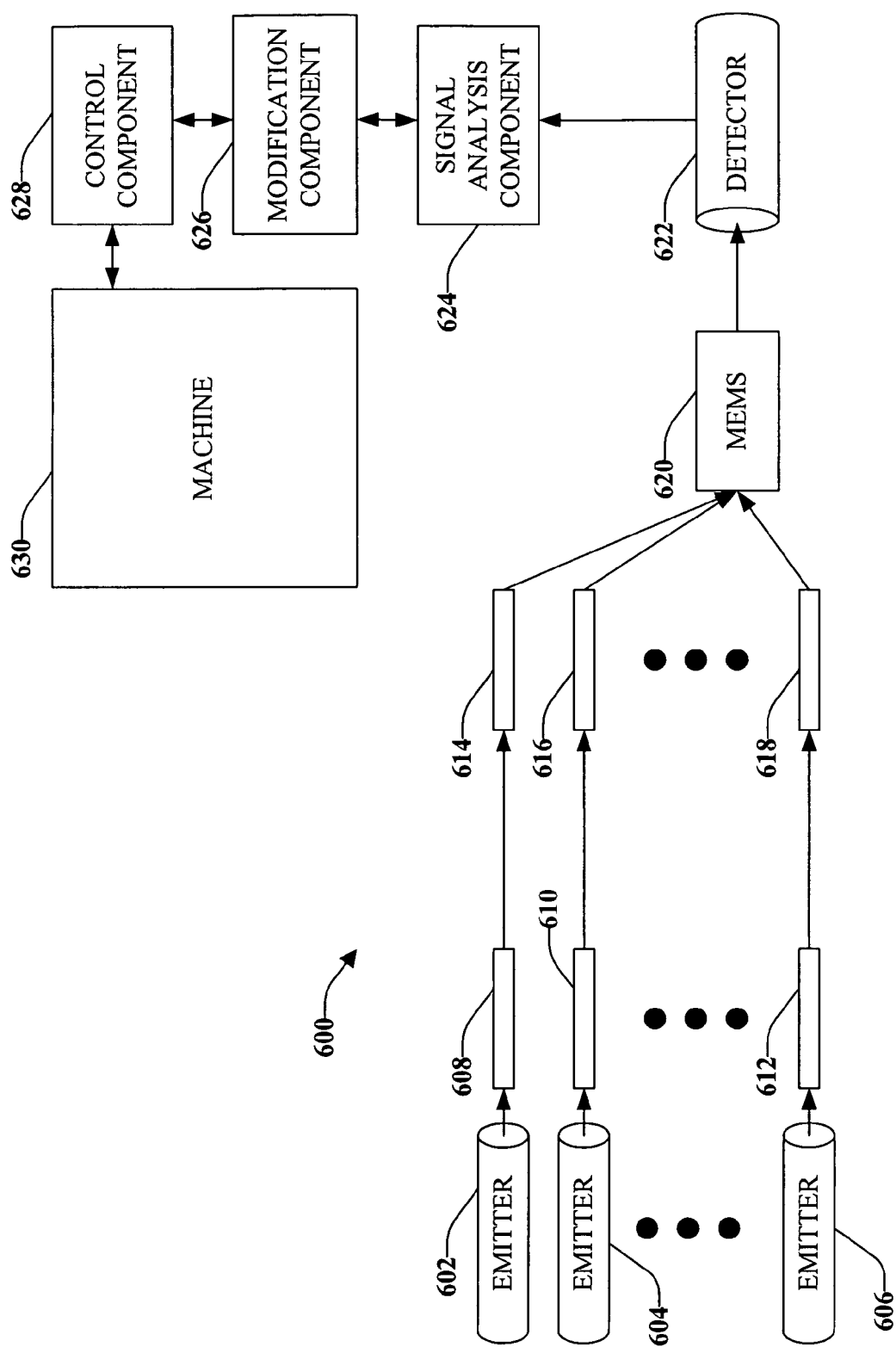
FIG. 6 illustrates a safety light curtain that includes a MEMS that receives light from a plurality of optical fibers and relays the light to a detector.

Turning now to FIG. 6, yet another safety light curtain 600 that accords to the claimed subject matter is illustrated. The safety light curtain 600 includes a plurality of emitters 602-606, which can be associated with a first plurality of light wave guides 608-612. Each of the first plurality of light wave guides can be associated with various optical elements that aid in receipt of light from the plurality of emitters 602-606 and deliverance of light to a second plurality of light wave guides 614-618. It is to be understood that the light wave guides 608-612 are optional in the safety light curtain, and that the plurality of emitters 602-606 can be configured to provide light directly to the second plurality of light wave guides 614-618. As with the first plurality of light wave guides 608-612, the second plurality of light wave guides 614-618 can be associated with various optical elements that facilitate receiving light from the plurality of emitters 602-606 and/or the first plurality of light wave guides 608-612 as well as deliverance of light to a MEMS 620. The MEMS 620 can be employed to sequentially provide light received from the second plurality of light wave guides 614-618 to a detector 622. For example, the MEMS 620 can include a mirror, wherein a position of the mirror is rapidly altered to effectuate deliverance of light to the detector 622 from each of the plurality of light wave guides 614-618 over a short period of time.

The detector 622 can convert received optical signals to electrical signals and provide such signals to a signal analysis component 624. The electrical signals can be representative of status of beams of light received by the second plurality of light wave guides 614-618. Thus, the analysis component 624 can determine whether one or more beams of light are obstructed. Upon making the determination, a modification component 626 can determine if an operator has desired to "ignore" one or more beams. For instance, a modification can be made to a machine to enable appropriate operation of such machine. The modification, however, can result in obstruction of one or more beams of light. Thus, the safety light curtain 600 can be designed to ignore one or more beams of light. Similarly, a moving object can be associated with the safety light curtain 600, wherein a machine associated with the safety light curtain 600 requires use of a moving object that can obstruct one or more beams at particular instances in time. The modification component 626 can be aware of such object and can "ignore" obstructed beams associated with the moving object. A control component 628 associated with the signal analysis component 624 and the modification component 626 can control an operating parameter of a machine 630 that is related to the safety light curtain 600. For example, if a threshold number of beams are obstructed and the modification component 626 is not configured to "ignore" such beams, the control component 628 can shut down the machine 630.

Referring to FIGS. 7-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
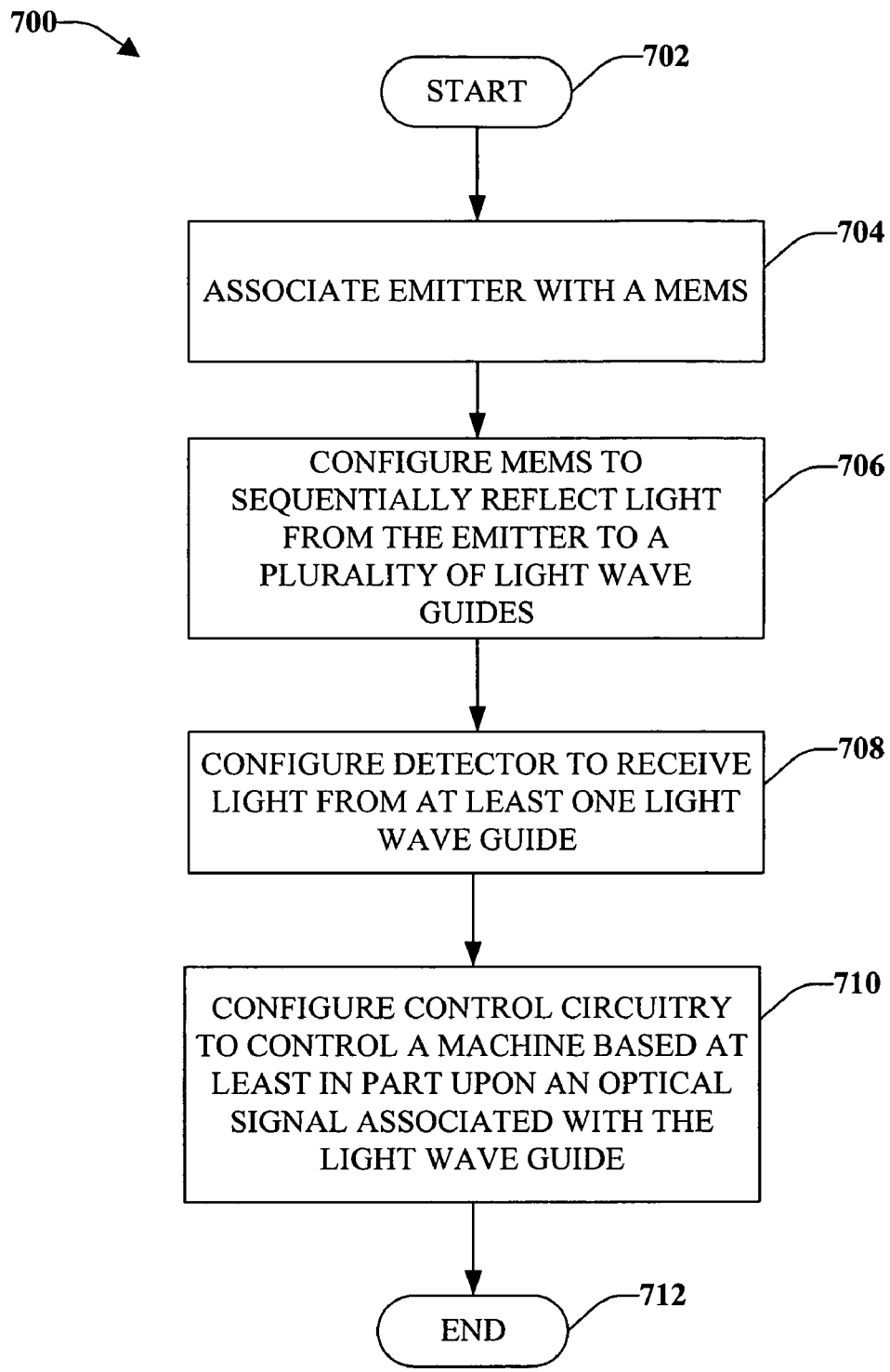
FIG. 7 is a representative flow diagram of a methodology for creating a safety light curtain.

Turning specifically to FIG. 7, a methodology 700 for creating a safety light curtain is illustrated. The methodology 700 starts at 702, and at 704 an emitter is associated with a MEMS. For instance, the emitter can be configured to direct light towards the MEMS, which can include one or more mirrors. At 706, the MEMS is configured to sequentially reflect light from the emitter to each of a plurality of light wave guides (which can be, e.g., optical fibers). For example, the MEMS can be provided with voltages/currents that cause at least one mirror associated with the MEMS to alter position, and therefore light is directed to a different light wave guide. The position of the at least one mirror can change very rapidly (e.g., microseconds), such that a short period of time exists that a light wave guide is not receiving light.

At 708, a detector is configured to receive light from at least one light wave guide. For example, a detector can receive light from one of the aforementioned plurality of light wave guides. In another example, light can be relayed between disparate light wave guides and thereafter received by the detector. In yet another example, a MEMS can be employed to sequentially deliver light from a plurality of light wave guides to the detector. Thus, any suitable arrangement that enables the detector to receive light from at least one light wave guide is contemplated by the inventors and intended to fall under the scope of the hereto-appended claims.

At 710, control circuitry is configured to control a machine based at least in part upon light received (or not received) from the at least one light wave guide. For instance, the emitter can provide light to the MEMS, which can direct it to multiple light wave guides, which are substantially parallel to one another and spaced a particular distance apart. The light can then be relayed from the light wave guides to at least one detector, resulting in several beams of light that are substantially parallel traveling through air. If a threshold number of the beams of light are obstructed (e.g., the detector does not receive a beam of light), the control circuitry can be employed to shut down a machine associated with the beam of light. The methodology 700 completes at 712.

Figure 8:
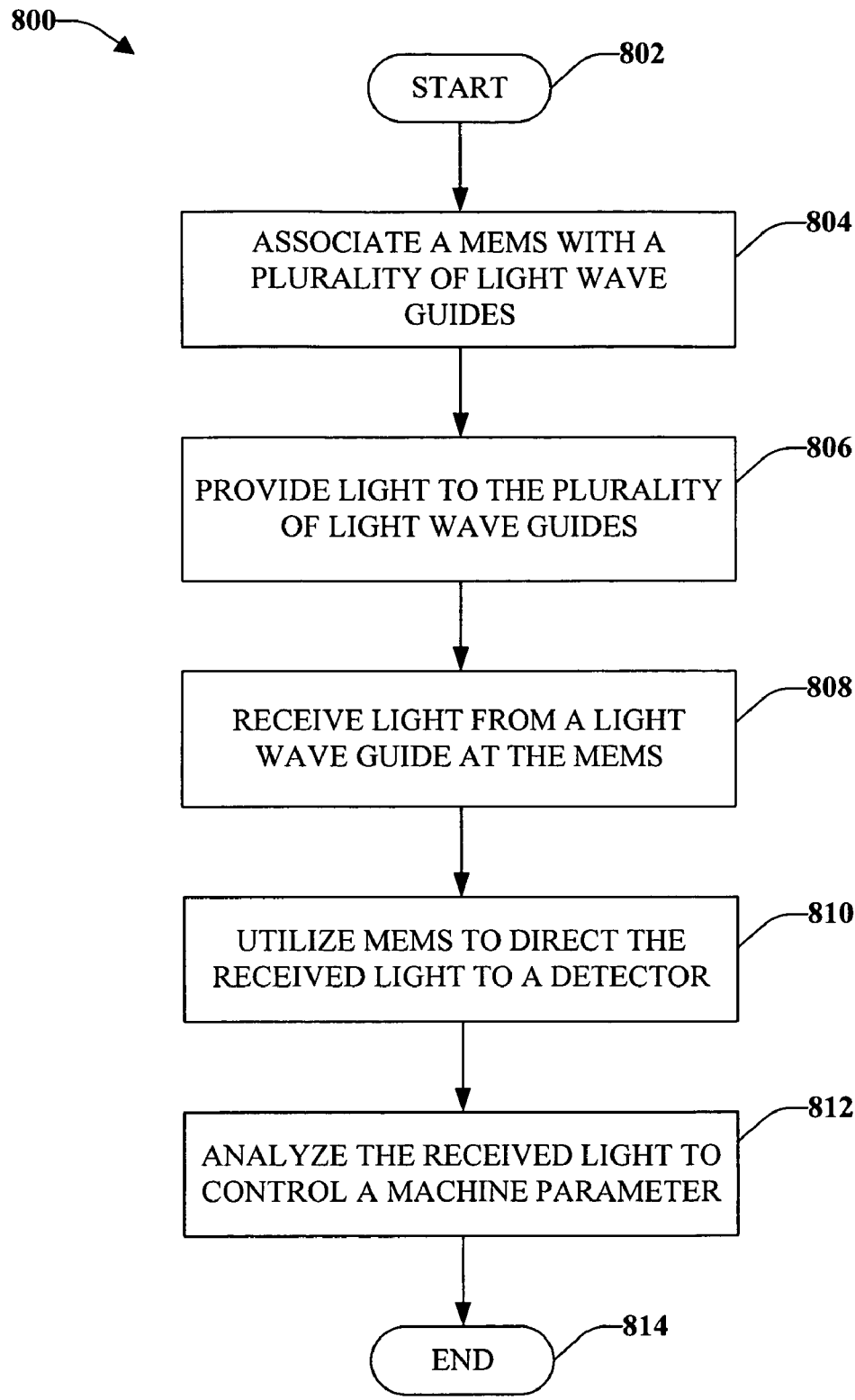
FIG. 8 is a representative flow diagram of a methodology for controlling a machine based upon analyzed optical signals.

Turning now to FIG. 8, a methodology 800 for utilizing a safety light curtain is illustrated. The methodology 800 initiates at 802, and at 804 a MEMS is associated with a plurality of light wave guides. For instance, the MEMS can be configured to receive light from each of the plurality of light wave guides in a sequential manner and deliver the received light to at least one detector. Thus, the MEMS can include one or more mirrors, wherein a position of the mirrors rapidly alters to enable the detector to receive optical signals relating to each of the plurality of light wave guides. At 806, light is provided to the plurality of light wave guides. For example, the light can be provided by a plurality of emitters, can be provided by other light wave guides, etc.

At 808, light from one of the light wave guides is received at the MEMS. In other words, at least one mirror within and/or associated with the MEMS is adapted to receive light from the light wave guide. At 810, the MEMS is employed to direct the received light to a detector. For instance, the MEMS can receive voltage and/or current that causes the at least one mirror to direct light received from the light wave guide to the detector. At 812, an optical signal received at the detector (light received or not received) is analyzed to control operation of a machine. For instance, if the detector does not receive light when it is expecting a beam from the MEMS, it can be determined that an object has obstructed the beam. This information can be utilized to alter operation of the machine (e.g., shut down the machine). The methodology 800 then completes at 814.

Figure 9:
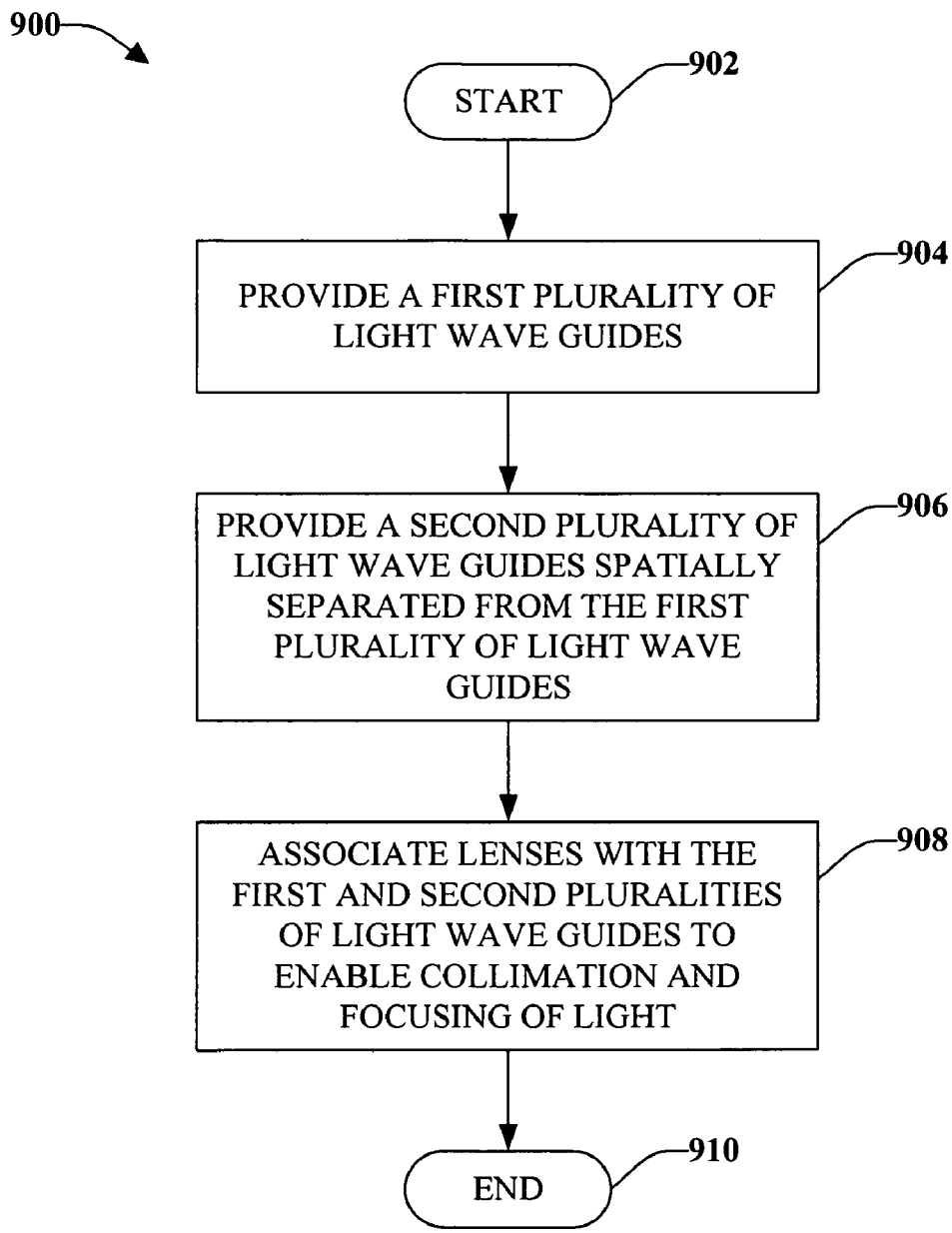
FIG. 9 is a representative flow diagram of a methodology for associating fiber optics with optical fibers to aid in directing light between optical fibers over a spatial region.

Referring now to FIG. 9, a methodology 900 for preparing light wave guides (such as optical fibers) for employment within a safety light curtain is illustrated. The methodology 900 starts at 902, and at 904 a first plurality of light wave guides are provided. At 906, a second plurality of light wave guides is provided and spatially separated from the first plurality of light wave guides. Thus, light emitted from the first plurality of light wave guides travels through space (air) prior to being received at the second plurality of light wave guides. Furthermore, guides in the first plurality of light wave guides can be configured to deliver beams of light to the second plurality of light wave guides in a substantially parallel manner. At 908, optical elements are associated with the first and second plurality of light wave guides to enable collimation of light relayed therebetween. For instance, one or more lenses can be associated with the light wave guides to facilitate proper operation of the safety light curtain. The methodology 900 then completes at 910.

Figure 10:
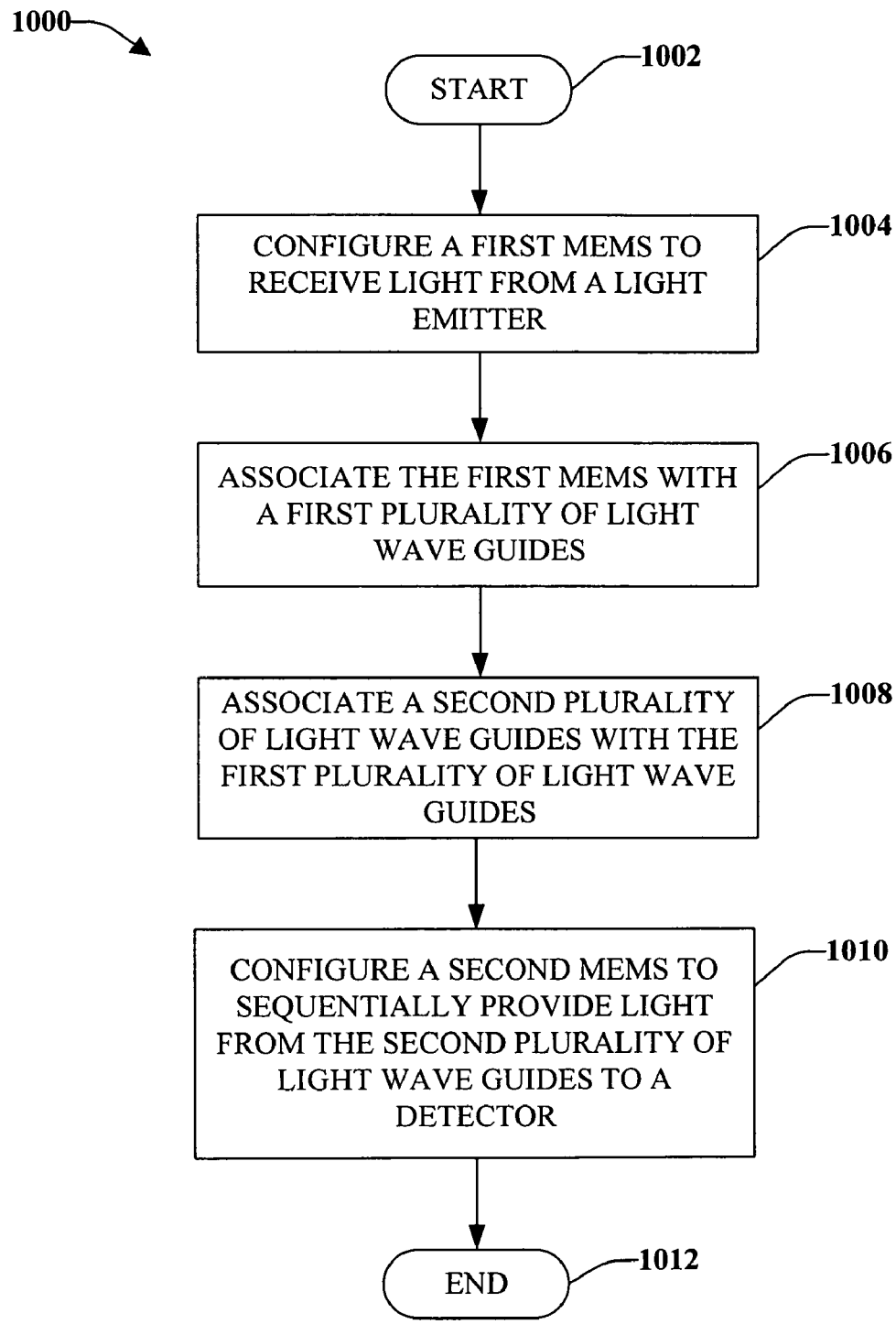
FIG. 10 is a representative flow diagram of a methodology for configuring a MEMS to sequentially provide light to a detector.

Now turning to FIG. 10, a methodology 1000 for creating a safety light curtain with a reduced number of detectors is illustrated. The methodology 1000 starts at 1002, and at 1004 a MEMS is configured to receive light from an emitter. For instance, the MEMS can be configured to receive light from the emitter and direct light sequentially to a plurality of positions. At 1006, the MEMS is associated with a first plurality of light wave guides, wherein the MEMS can relay light from the emitter to each of the first plurality of light wave guides in a particular order. The MEMS can operate rapidly, thereby ensuring that a small amount of time passes (e.g., milliseconds) between the light wave guide receiving light from the MEMS. At 1008, a second plurality of light wave guides is associated with the first plurality of light wave guides, wherein light wave guides within the first plurality of light wave guides correspond to light wave guides within the second plurality of light wave guides. More specifically, a one-to-one relationship can exist between the first and second pluralities of light wave guides, such that light emitted from a light wave guide within the first plurality of light wave guides is received by a corresponding light wave guide within the second plurality of light wave guides. Furthermore, the first and second pluralities of light wave guides can be spatially separated, such that light emitted from the first plurality of light wave guides travels through air a desired distance prior to being received by the second plurality of light wave guides. At 1010, a MEMS is configured to sequentially provide light from the second plurality of light wave guides to a detector. The methodology 1000 then completes at 1012.

Figure 11:
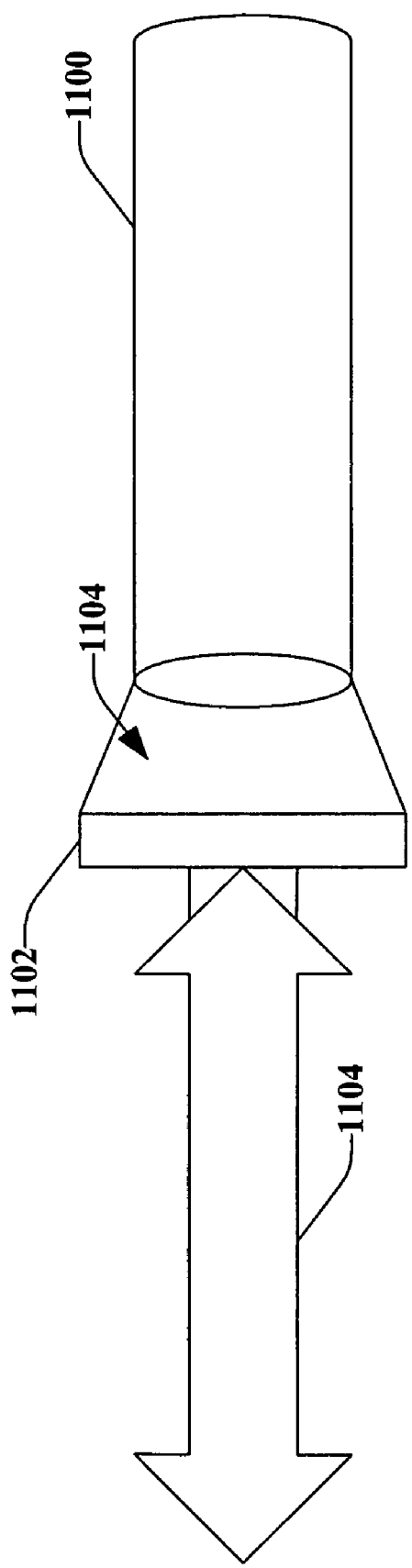
FIG. 11 illustrates an optical fiber and exemplary optical element(s) associated therewith.

Referring now to FIG. 11, a light wave guide 1100 (e.g., an optical fiber) and associated optical element(s) 1102 are shown operating in conjunction. Light travels through the light wave guide 1100 until an end of such guide is reached. The light 1104 then may become unfocused and/or diverge from a desired direction. Optical element(s) 1102, which can be a lens or any other suitable optical element, can be employed to focus/direct the light. For instance, after reaching the optical element(s) 1102, the light can be focused and/or directed in a desired direction (e.g., through space to a disparate light wave guide). Furthermore, optical element (s) can be associated with an input of a wave guide, thereby aiding in directing light to a core of the wave guide.

Figure 12:
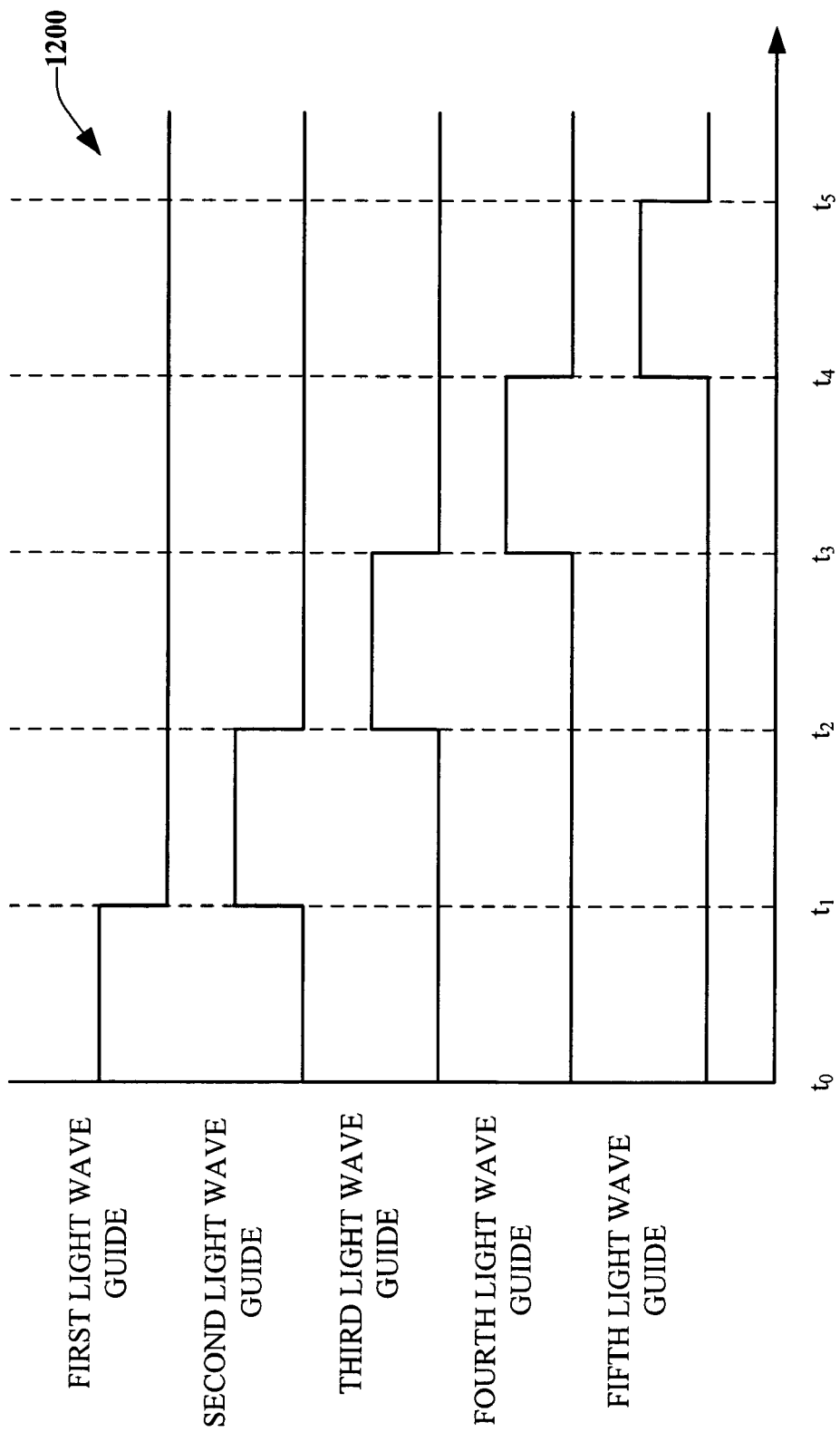
FIG. 12 is an exemplary timing diagram illustrating relay of light to a plurality of optical fibers from a MEMS.

Now turning to FIG. 12, a timing diagram 1200 illustrating an exemplary manner in which a MEMS can relay light from an emitter to a plurality of light wave guides and/or a manner in which a MEMS can relay light from a plurality of light wave guides to a detector is provided. For instance, at time $t_0$, light is delivered to and/or received from a first light wave guide. In other words, a MEMS is configured, for example, to relay light from an emitter to the first light wave guide at time $t_0$. At time $t_1$, the MEMS receives a voltage or current that causes a position of a mirror comprised by and/or associated with the MEMS to relay and/or receive light to/from a second light wave guide. At time $t_2$, the MEMS is configured to relay and/or receive light to/from a third light wave guide, and at time $t_3$ the MEMS can be reconfigured with respect to a fourth light wave guide. At time $t_4$, the MEMS is configured to relay light to a fifth light wave guide or receive light from the fifth light wave guide. Thus, it can be discerned that a MEMS can sequentially relay light from an emitter to a plurality of light wave guides or sequentially relay light from a plurality of light wave guides to a detector over small ranges of time.

Figure 13:
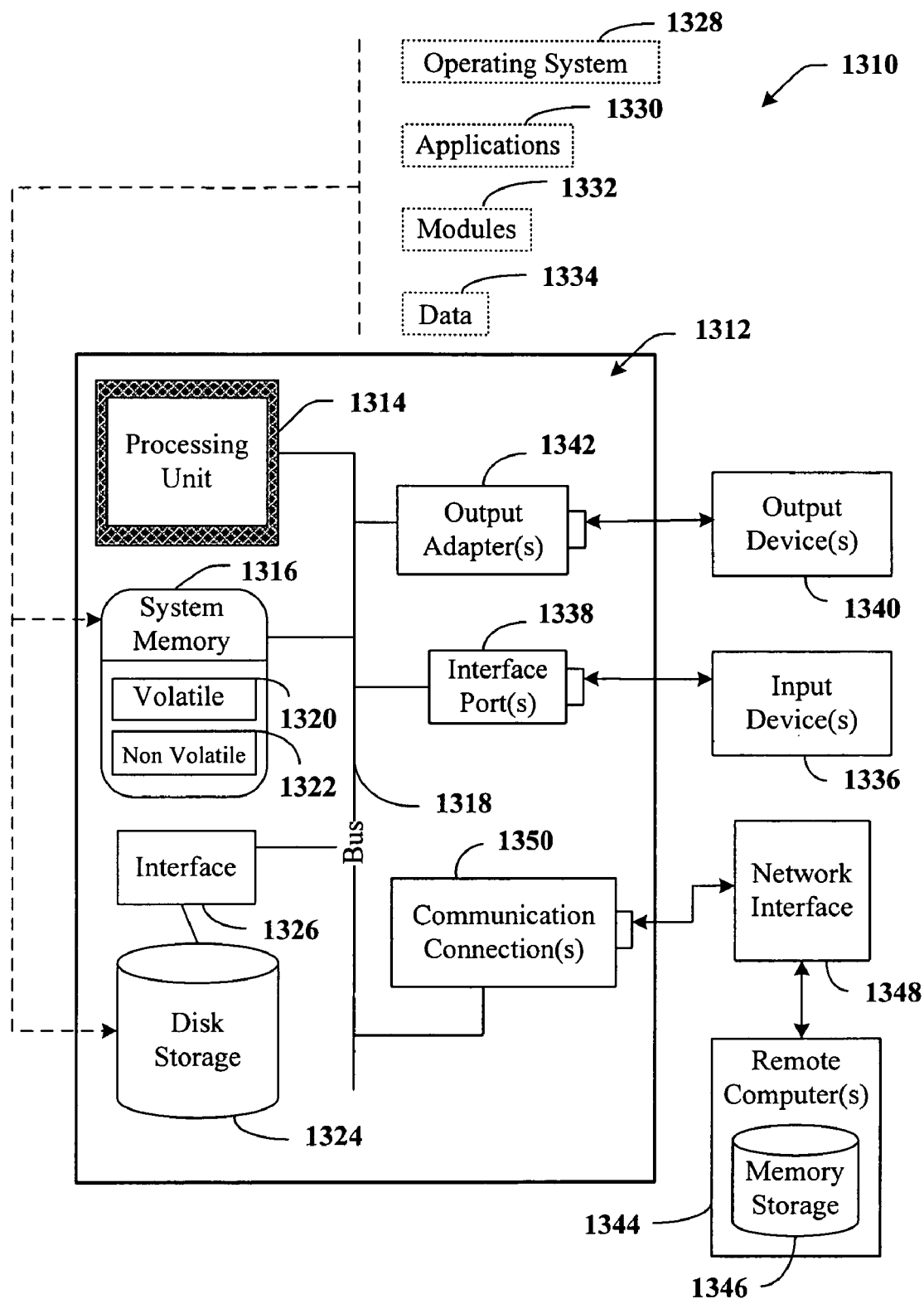
FIG. 13 is an exemplary computing environment that can be utilized in connection with the claimed subject matter.

With reference to FIG. 13, an exemplary environment 1310 for implementing various aspects of the claimed subject matter, including controlling operation of a machine and analyzing optical signals, includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example a disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the subject invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A safety light curtain system, comprising:
   a light emitter;
   a first micro-machined electro-mechanical system (MEMS) that receives light emitted by the emitter and sequentially reflects the received light to a first plurality of light wave guides;
   a second plurality of light wave guides configured to receive light from the first plurality of light wave guides, the first and second plurality of light wave guides are spatially separated;
   a detector that receives an optical signal relating to light from at least one of the second plurality of light wave guides, the optical signal received by the detector employed to control operation of a machine associated with the safety light curtain; and
   a second MEMS device that sequentially reflects light from the second plurality of light wave guides to the detector.

2. The system of claim 1, further comprising:
   a plurality of detectors that receive optical signals relating to light relayed from the first plurality of light wave guides, respectively, the optical signals received by the plurality of detectors employed to control operation of the machine associated with the safety light curtain.

3. The system of claim 2, further comprising a shift register that is communicatively coupled to the plurality of detectors, the shift register employed to transfer signals relating to each of the first plurality of light wave guides.

4. The system of claim 3, further comprising an analysis component that sequentially analyzes status of each received light signal to determine whether operation of the machine is to be altered.

5. The system of claim 4, further comprising a control component that causes the machine to shut down based upon an analysis of the status of the received light signals.

6. The system of claim 1, further comprising a monitoring component that monitors the MEMS to ensure that the MEMS is operating within threshold performance measures.

7. The system of claim 6, the performance measures include at least one of velocity of movement of the MEMS and angles of reflection of the MEMS.

8. The system of claim 6, further comprising an alarm component that generates an alarm if the MEMS is operating outside the threshold performance measures.

9. The system of claim 1, further comprising a power supply that provides the MEMS with an electrical charge that causes the MEMS to reflect light received from the emitter to a next light wave guide in the sequence.

10. The system of claim 1, the emitter, the detector, and the MEMS are each enclosed within one or more explosion-resistant housings.

11. The system of claim 1, the MEMS comprises a mirror.

12. The system of claim 1, further comprising:
    a synchronization component that maintains synchronization of the emitter and detector.

13. The system of claim 1, further comprising a signal analysis component that analyzes optical signals associated with the second plurality of light wave guides at the detector and determines whether the machine should be shut-down based at least in part upon the analysis.

14. The system of claim 1, further comprising a modification component that enables one or more beams associated with the first plurality of light wave guides to be ignored when controlling the machine.

15. The system of claim 1, the first plurality of light wave guides comprises an optical fiber.

16. A methodology for creating a safety light curtain, comprising:
    associating a light emitter with a first MEMS;
    configuring the first MEMS to sequentially reflect light from the emitter to a first plurality of light wave guides;
    configuring a second plurality of light wave guides to receive light emitted from the first plurality of light wave guides, the first and second pluralities of light wave guides are spatially separated;
    configuring a second MEMS to receive light from the second plurality of light wave guides and to sequentially provide light from each light wave guide within the second plurality of light wave guides to a detector; and
    controlling a machine based upon an optical signal received at the detector, the optical signal is associated with the at least one of the second plurality of light wave guide.

17. The methodology of claim 16, the first MEMS comprises a mirror.

18. The methodology of claim 16, further comprising configuring a power source to provide at least one of current and voltage to the first MEMS in connection with configuring the first MEMS to sequentially reflect light from the emitter to the first plurality of light wave guides.

19. The methodology of claim 16, further comprising associating optical elements with the first plurality of light wave guides to facilitate collimation of light emitted from the first plurality of light wave guides.

20. The methodology of claim 16, further comprising configuring the first plurality of light wave guides to emit light in a substantially parallel manner.

21. The methodology of claim 16, the at least one light wave guide and the detector are spatially separated such that a beam of light emitted from the at least one light wave guide travels through space prior to being received at the detector.

22. The methodology of claim 16, further comprising monitoring the first MEMS to ensure that the first MEMS is meeting performance thresholds.

23. The methodology of claim 16, further comprising shutting down the machine if a beam of light emitted from the at least one light wave guide is obstructed prior to being received by the detector.

24. The methodology of claim 16, further comprising synchronizing the first and second MEMS.

25. The methodology of claim 16, further comprising housing the emitter and the detector in an explosion-resistant housing.

26. The methodology of claim 16, further comprising synchronizing the emitter and the detector.

27. The methodology of claim 16, the first plurality of light wave guides comprises at least one optical fiber.

28. A safety light curtain, comprising:
   means for providing light to a first MEMS;
   means for controlling the first MEMS to sequentially direct light to a first plurality of light wave guides;
   means for directing the light from the first plurality of light wave guides to a second plurality of light wave guides;
   means for controlling a second MEMS to receive light from the second plurality of light wave guides and direct received light to a detector; and
   means for determining whether operation of a machine should be altered based upon light received at the detector.

* * * * *